United States Patent Office 3,402,140
Patented Sept. 17, 1968

3,402,140
ETHYLENE-PROPYLENE RUBBER
COMPOUNDING
Frederic W. Bickel, Burbank, and Thomas B. Squire and Gerald H. Peterson, Santa Monica, Calif., assignors, by mesne assignments, to McDonnell Douglas Corporation, Santa Monica, Calif., a corporation of Maryland
No Drawing. Filed Dec. 28, 1964, Ser. No. 421,662
17 Claims. (Cl. 260—38)

ABSTRACT OF THE DISCLOSURE

An ethylene-propylene copolymer or terpolymer rubber, containing a tackifier composed of a polypropylene, preferably amorphous polypropylene, and one or more resins, including phenolic resins, coumarone-indene resins, terpene resins, butadiene-styrene resins, polybutadiene resins, and hydrocarbon resins, said tackifier substantially improving the tackiness of the uncured rubber and the adherence of layers of such rubber to each other, and designed particularly for fabrication of a tire formed of layers of ethylene-propylene rubber.

The instant invention relates to an ethylene-propylene rubber composition, including an ethylene-propylene copolymer rubber component or an ethylene-propylene terpolymer rubber component, having enhanced tackiness, and is particularly concerned with ethylene-propylene rubber compositions, especially those including an ethylene-propylene terpolymer, having incorporated therein a material which substantially increases the tackiness of such rubbers.

Typically, ethylene-propylene rubber can be manufactured by copolymerization of ethylene and propylene, by passing ethylene and propylene gases into normal hexane in which the necessary catalysts are in solution. A typical catalyst system can contain vanadium oxychloride and triethyl aluminum chloride, the proportion of which may be varied to produce polymers of various molecular sterospecificities. The copolymerization is carried out in the absence of any moisture. Atmospheric or moderately elevated pressures and normal room temperatures are suitable. During the course of copolymerization, the system becomes thick and viscous. The thick, viscous reaction mixture is washed with water to remove the catalyst and the solvent is removed by flashing.

More recently ethylene-propylene terpolymer rubbers have been developed which are produced by polymerization of ethylene, propylene and a small amount of a third monomer. Such third monomer is generally a diene, and can be a conjugated or nonconjugated straight chain diene, or a nonconjugated cyclic diene. Examples of such straight chain conjugated dienes are 1,3-butadiene and isoprene, and examples of the nonconjugated dienes are dicyclopentadiene, 2 - methylenenorbornene, 11 - ethyl-1,11 - tridecadiene, and 2-(2'-ethyl-2'-butenyl)norbornene. The ethylene-propylene-diene terpolymer can be obtained, for example, by introducing the diene, e.g., 11-ethyl-1,11-tridecadiene, into a solvent such as tetrachlorethylene, and then introducing ethylene and propylene gases into the solution containing catalyst, for example, a combination of aluminum triisobutyl and vanadium oxychloride. The precipitated polymer is washed with methanol and acetone, and is then dried. In such terpolymer rubbers the mole percent of the diene component is substantially less than the mole percent of either ethylene or propylene.

Typical ethylene-propylene copolymer or terpolymer rubbers can contain, for example, about 40 to about 60 mole percent ethylene and about 60 to about 40 mole percent propylene. In a typical ethylene-propylene terpolymer rubber, about 0.1 to about 1.0 mole of diene monomer per kilogram of copolymer, can be employed. The molecular weight for the ethylene-propylene copolymer or terpolymer can range from about 100,000 to about 1,000,000, with the average molecular weight of such polymers in the range of about 250,000 to about 400,000.

As in the case of the ethylene-propylene copolymer rubbers, the terpolymers are also relatively inexpensive rubbers. Both the copolymer and terpolymer rubbers have excellent physical properties which render them highly useful for industrial purposes. For example, these polymers have excellent high temperature resistance, abrasion resistance, ozone and oxygen resistance, weathering and age resistance, and resilience, and have low hysteresis loss. In general, these rubbers have a combination of properties rendering them exceedingly useful in making automobile tires, except for the fact that they lack the degree of tackiness which is required in the process of manufacturing tires.

In the manufacture of tires, in accordance with conventional procedure, strips of rubber covered cord are applied in laminar fashion to a form to produce the carcass, and in so doing it is important that each layer be securely bonded to each adjoining layer without inclusion of air bubbles or pockets. In the next step in the manufacture of tires, a breaker strip is applied to the previously formed carcass. At this step, it is also important that a secure bonding be achieved with no air pockets. Finally, the sidewall and tread are applied and it is again important that a secure bonding be achieved with no air pockets. In each of these stages uncured rubber compound is employed, and to achieve good bonding and to eliminate air pockets, it has been recognized that the uncured rubber compound should be a tacky rubber compound which if not tacky will not bond well to adjoining layers and will leave air pockets. The term "tack" or "tackiness" is understood to mean the characteristic of rubber which causes two fresh surfaces thereof to adhere or coalesce. This property is of critical importance in the manufacture of tires.

Ethylene-propylene-rubbers, including both the copolymers and terpolymers described above, as provided heretofore, have lacked tackiness and therefore have not been adapted previously to the manufacture of tires. By the term "ethylene-propylene rubber" or "ethylene-propylene rubbers" is meant both ethylene-propylene copolymer rubbers and ethylene-propylene terpolymer rubbers as described above.

In our copending application Ser. No. 421,727, filed of even date herewith, now abandoned, there is described and claimed an uncured ethylene-propylene rubber comprising polypropylene as a tackifier material.

It is an object of the present invention to provide an ethylene-propylene rubber having improved tackiness characteristics.

A further object of this invention is to impart tackiness to uncured ethylene-propylene rubbers including copolymers thereof and also terpolymers.

A still further object of the invention is to impart to uncured ethylene-propylene rubbers a desirable tackiness without appreciably adversely affecting other properties of the rubber.

Still another object is the provision of uncured ethylene-propylene rubbers, particularly ethylene-propylene terpolymer rubber, having incorporated therein a composition which substantially improves the tackiness of such rubbers, as compared to the use of polypropylene separately.

A still further object of the invention is the provision of a novel tackifier composition for an ethylene-propylene rubber.

Still another object is to provide procedure for fabrication of a rubber article, particularly a tire, formed of several, e.g., 2 or more, layers of material containing therebetween uncured ethylene-propylene rubber so that such layers of material have improved adhesion to each other.

Other objects and advantages of the invention will appear hereinafter.

The above objects and advantages are achieved according to the invention by incorporating in an uncured ethylene-propylene rubber a tackifier material comprising a polypropylene and one or more resins of a type described below, e.g., a tackifier composition containing approximately equal weight proportions of polypropylene and such resins. The resins which are incorporated with the polypropylenes in the improved tackifier of the invention include phenolic resins, coumarone-indene resins, terpene resins, butadiene-styrene resins, polybutadiene resins, and hydrocarbon resins. It has been found that the novel tackifier of the invention including both the polypropylene and one or more of the above resins, when incorporated in an ethylene-propylene rubber, particularly a terpolymer, generally provides substantially improved tackiness of the uncured rubber and substantially greater adherence of layers of such rubber to each other, as compared to the same ethylene-propylene rubber containing polypropylene separately, or the resin component separately of such novel tackifier composition. Further, the ethylene-propylene rubber compositions containing as tackifier a combination of polypropylene and a resin component as defined above, has an enduring substantial tack lasting for several days, as compared to the ineffective and fugitive degree of tack for the ethylene-propylene rubber alone or the ethylene-propylene rubber containing the resin component, but in the absence of polypropylene. The improved tackiness provided by the tackifier composition containing polypropylene and resin component is achieved without adversely affecting any of the desirable characteristics of these ethylene-propylene rubbers.

Polypropylenes suitable for use according to the invention can vary from a liquid to a semi-solid or solid, e.g., of wax-like consistency, and preferably range in molecular weight from about 300 to about 3,000. Preferred polypropylenes for purposes of the invention are those in liquid form. Although not preferred, polypropylenes or polypropenes in the form of solids and of higher molecular weight than those noted above, can also be employed as a tackifier for ethylene-propylene rubber according to the invention. The polypropylenes are known materials generally produced by catalytic polymerization of propylene derived, for example, from a petroleum hydrocarbon source, in the presence of catalysts such as titanium trichloride and aluminum or lithium alkyls. A typical process for producing such polypropylenes is described in Journal of Polymer Science, Part C, No. 1, pp. 237–279 (1963), "Ziegler Polymerization of Olefins" by J. Boor, Jr.

The polypropylenes are generally soluble in benzene, ethyl ether, petroleum and coal tar distillates, and chlorinated hydrocarbons, and insoluble in ethyl and isopropyl alcohols, acetone and most highly polar solvents. A commercially available form of polypropylenes suitable for incorporation into an ethylene-propylene rubber according to the invention is the liquid amorphous polypropylene marketed as "Amopol C–175" or "Polypropene C–175." The terms "polypropylene" and "polypropene" are used interchangeable in the art and in this application to denote the same material, which is described above.

The resins which can be employed together with the polypropylene in the improved and preferred tackifier composition hereof are liquid, semi-solid to solid, complex amorphous materials generally in the form of mixtures of organic compounds having no definite melting point and no tendency to crystallize. Such resins are insoluble in water, as distinct from gums, and can be of vegetable or animal origin, or can be synthetic resins. The resins employed are compatible with the polypropylene component of the tackifier, and function in combination with such component to provide substantial and improved tackiness of the ethylene-propylene copolymer or terpolymer rubber, superior to the tackiness of such rubber produced by polypropylene or such resin component, separately.

The preferred class of resins which can be employed in the tackifier of the invention are the phenolic resins. Preferably resol phenolic resins are employed, that is, those which can be dissolved in a solvent such as ketones, e.g., acetone, and alcohols, e.g., ethyl alcohol. Typical of such resins are the phenol-aldehyde resins including phenol-formaldehyde resins, halogenated, e.g., chlorinated, phenol-formaldehyde resins, with halogen substitution on the aromatic ring or on a substituent, e.g., an alkyl group such as a methyl group, on the aromatic ring, phenol-acetaldehyde resins, phenol-acrolein resins, phenol-furfural resins, and the like. Some commercial resins of this type are the phenol-formaldehyde resins marketed as Amberol ST–137X, Catalin 9986 and Durez 19900, and the brominated phenol-formaldehyde resins marketed as SP–1055.

Another class of resin components which can be employed together with a polypropylene in the tackifier composition hereof, are the coumarone-indene resins, such as the para coumarone-indene resins. Generally the coumarone-indene resins which can be employed have a molecular weight which ranges from about 500 to about 5,000. Examples of resins of this type which are available commercially include those materials marketed as Picco–25 and Picco–100.

Another class of resins which can be employed together with the polypropylene component in the tackifier hereof are the terpene resins, including also styrenated terpenes. These terpene resins can have a molecular weight range from about 600 to about 6,000. Typical commercially available resins of this type are marketed as Piccolyte S–100, and as Staybelite Ester #10, which is a glycerol ester of hydrogenated rosin.

A fourth class of resins which can be employed in the tackifier together with the polypropylene component are the butadiene-styrene resins having a molecular weight ranging from about 500 to about 5,000. A typical commercial product of this type is marketed as Buton 100, a liquid butadiene-styrene copolymer resin having a molecular weight of about 2,500, A fifth class of resins which can be employed as resin component in the tackifier hereof are the polybutadiene resins having a molecular weight ranging from about 500 to about 5,000. A commercially available product of this type is that marketed as Buton 150, a liquid polybutadiene resin having a molecular weight of about 2,000 to about 2,500.

A sixth class of resins which can be employed as resin component in the invention tackifier are the so-called hydrocarbon resins produced by catalytic polymerization of selected fractions obtained in the refining of petroleum, and having a molecular weight range of about 500 to about 5,000. Examples of such resin are those marketed as Piccopale–100, and as Amoco and Velsicol resins.

It has been found that the phenolic or phenolaldehyde resins when employed in combination with polypropylene in the tackifier of the invention, impart superior tack to ethylene-propylene rubbers as compared to the other resins noted above. The coumarone-indene, terpene and hydrocarbon resins, in combination with polypropylene impart superior tackiness to such rubbers as compared to the butadiene-styrene and polybutadiene resins. The resins usually and preferably are in liquid form, but can also be employed in solid form in combination with polypropylene.

The proportion of polypropylene to resin which can be employed in the tackifier composition of the invention can vary depending upon such factors as the degree of tackiness desired and the particular ethylene-propylene copolymer or terpolymer rubber employed. The weight ratio of polypropylene to resin component in the tackifier can accordingly range from about 3:1 to about 1:3. An increase in the ratio of resin component to polypropylene tends to increase the tackiness of the resulting ethylene-propylene rubber in which the tackifier composition is incorporated. Generally, a larger proportion of resin component as compared to polypropylene is employed. The use of approximately equal weight proportions of polypropylene and resin components in the tackifier composition hereof has been found particularly desirable.

The tackifier composition of the invention including polypropylene and the resin component, can be incorporated in an ethylene-propylene rubber, as described above, which can be in the form either of an elastomeric solid or an oil extended rubber in which the above-described ethylenepropylene copolymer or terpolymer is extended with an oil of paraffinic, naphthenic or aromatic character. The tackifier can be incorporated in the ethylene-propylene copolymer or terpolymer rubber in varying proportions, preferably employing a minor amount of tackifier, which can range from about 2.5 to about 50 parts, preferably about 5 to about 35 parts, of the tackifier composition to 100 parts of the rubber, by weight.

Various conventional additives can be incorporated in the ethylene-propylene rubbers containing the tackifier composition of the invention in preparing the uncured or unvulcanized rubber compound. These include, for example, fillers, pigments, activators, accelerators, cross-linking agents or promotors, and plasticizers.

Fillers generally employed in rubber formulations are the carbon blacks. Any well known type of carbon black can be employed for incorporation in the ethylene-propylene rubber formulations of the invention including furnace blacks, thermal blacks and channel blacks. The carbon black filler employed in the ethylene-propylene rubber formulations of the invention including the novel tackifier hereof, improves abrasion resistance, tensile strength and tear resistance of the cured rubber compound. The carbon black can be employed in amounts ranging from about 5 to about 200 parts, preferably about 25 to about 75 parts, per 100 parts of the ethylene-propylene copolymer or terpolymer rubber employed as the base material, by weight.

Pigments are also generally employed in rubber formulations, and such materials can also be incorporated in the ethylene-propylene uncured rubber formulation including the tackifier, of the invention. Such pigments include, for example, metal oxides such as zinc oxide, titanium dioxide, antimony oxide, magnesium oxide, calcium oxide, lead oxide, and other pigments such as calcium carbonate, barium sulfate, zinc sulfied, talc, and the like. Such pigments in addition to their functioning to impart color to the cured rubber, also can function as a filler. The above metal oxides further function to activate the cure of the rubber and thus also function as a catalyst. The proportions of such pigments which can be employed can range from about 1 to as high as about 250 parts, preferably about 20 to about 100 parts, per 100 parts of the ethylene-propylene copolymer or terpolymer base rubber, by weight. Where metal oxides are employed, these materials are generally employed in an amount of about 1 to about 10 parts per 100 parts of the ethylene-propylene rubber by weight.

Accelerators can also be employed in the rubber formulation of the invention. Such accelerators can include any of the well known types of accelerators such as carbamates, thiazoles, aldehyde-amines, sulfenamides, and thiuram sulfides, e.g., the monosulfide, disulfide or tetrasulfide. Preferred materials are the dithiocarbamates, such as zinc dimethyl dithiocarbamate, and the thiuram disulfides, e.g., tetramethyl thiuram disulfide. The proportions of such accelerators which can be employed range from about 0.5 to about 5, preferably about 1 to about 3 parts per 100 parts of the base ethylene-propylene rubber by weight.

Cross-linking systems for curing the ethylenepropylene rubber include in addition to the above noted accelerators, a cross-linking agent. Thus, for example, sulfur is a well known cross-linking agent or vulcanizer for this purpose. However, in place of sulfur there can be employed as cross-linking agent a peroxide such as benzoyl peroxide, di-tertiary butyl peroxide, dicumyl peroxide, and the like; alkylene polyamines, such as ethylene diamine and triethylene tetraamine; quinone dioxime and substituted dioximes such as dibenzo quinone dioxime, and the like. Combinations of such cross-linking agents also can be employed. Where the ethylene-propylene copolymer is employed, which is an essentially saturated rubber, the above-noted organic cross-linking agents preferably are employed, utilizing only a very small amount, if any, of sulfur. Where the ethylene-propylene terpolymer rubber is employed, and which has some degree of unsaturation, either sulfur or an organic cross-linking agent of the above-noted types, or a combination thereof, can be employed. The proportion of cross-linking agent utilized can range from about 0.25 to about 5 parts, preferably about 1 to about 3 parts, per 100 parts of the ethylene-propylene rubber, by weight.

If desired, plasticizers also can be incorporated in the rubber formulation of the invention. Such plasticizers include, for example, polyethers such as the glycol polyethers, polyesters such as the dialkyl phthalates, e.g., dibutyl or dioctyl phthalate, and phosphate esters such as tricresyl phosphate, and dibutyl phenyl phosphate. Also, paraffinic, naphthenic and aromatic petroleum base oils can be used as extenders and plasticizers. The proportions of such plasticizers which can be employed can range from about 1 to about 20 parts or more per 100 parts of the ethylene-propylene rubber, by weight.

The tackifier of the invention including the polypropylene and resin component described above, can be incorporated in the ethylene-propylene copolymer or terpolymer rubber, or rubber formulation including any one or more of the optional additives noted above, in any suitable manner. Thus, for example, the specific ethylene-propylene rubber employed can be placed on a rubber mill to break the rubber down. The pigment and carbon black can be added and the resulting mixture blended thoroughly on the mill. Then the invention tackifier including the polypropylene and resin component, can be blended into the mixture on the mill. Following this, the cross-linking system including accelerator and cross-linking agent can be incorporated and the entire mixture thoroughly blended on the mill, providing an uncured rubber formulation according to the invention which has improved tackiness and which is particularly valuable in the manufacture of tires. During such blending on the rubber mill, no heat is applied and cooling water is circulated in the rolls of the mill, so as to prevent any premature curing of the rubber before it is employed in the desired application. As previously noted, the resulting uncured rubber can be stored for several days without significant loss of its desirable tacky properties.

Alternatively, the polypropylene can be incorporated into the solvent in which the polymerization of ethylene and propylene is carried out for producing the ethylene-propylene rubber.

In order to vulcanize or cure the above-noted formulation after it has been employed in the manufacture of a part such as as rubber tire, the tire, for example, containing the adherent layers of uncured rubber compound according to the invention, is placed in a mold of a press and the part is molded under high pressure, e.g., of the order of 150 pounds per square inch, with the application of heat at temperatures, e.g., of the order of about 300° to about 325° F. to provide the proper cure.

The following are examples of practice of the invention. In tests carried out employing the rubber formulations of the examples below, in the general procedure followed, a sheet of uncured rubber according to the formulations of the examples below is folded over on itself and a weight is placed thereon for a period of about 5 minutes. After this period the weight is removed and the two layers are pulled apart. The relative adhesion between such adjacent layers of rubber employing different tackifiers of the various rubber formulations is determined by the amount of force necessary to pull the layers apart.

In each of the examples below the proportions of components are given in terms of parts by weight unless otherwise indicated.

EXAMPLE 1

The following uncured rubber formulations shown as compositions A and B below are prepared, all amounts being expressed in terms of parts by weight.

|  | A | B | C |
|---|---|---|---|
| Ethylene-propylene terpolymer rubber | 100.0 | 100.0 | 100.0 |
| Zinc oxide | 5.0 | 5.0 | 5.0 |
| Furnace black | 40.0 | 40.0 | 40.0 |
| Polypropylene | 10.0 | 10.0 | ------ |
| Phenol-formaldehyde resin | 10.0 | 15.0 | ------ |
| Zinc dimethyl dithicarbamate | 2.0 | 2.0 | 2.0 |
| Tetramethyl thiuram disulfide | 1.0 | 1.0 | 1.0 |
| Sulfur | 1.25 | 1.25 | 1.25 |

In the above formulations the ethylene-propylene terpolymer rubber is a material marketed as Royalene 301X and is understood to be a terpolymer containing about 40 to about 50 mole percent ethylene, about 60 to about 50 mole percent propylene, and about 0.5 mole per kilogram of terpolymer of 2-methylenenorborene. The properties of this rubber are as follows:

Mooney viscosity (ML–4 at 212° F.) -- 60.
Stabilizer (nonstaining, percent) ----- 1.0.
Specific gravity ------------------- 0.865.
Iodine No. (g. per 100 g.) -------- 12.
Resistance to: ---------------------
    Weather Ozone ---------------- Excellent.
    Acids ------------------------- Excellent.
    Bases ------------------------- Good to excellent.
    Abrasion ---------------------- Good to excellent.
    Tearing ----------------------- Good.
    Steam ------------------------- Good.
    Compression set --------------- Excellent.
Dynamic properties ---------------- Good.
Color stability -------------------- Good to excellent.
Electrical properties -------------- Excellent.
Tack ------------------------------ Excellent.
Cord adhesion --------------------- Poor.
Cure rate ------------------------- Poor.
Oil loading ----------------------- Medium.
Black loading --------------------- Excellent.
Cold flow ------------------------- Excellent.
                                                          Excellent.

The polypropylene of formulations A and B is a product marketed as Amopol C–175 or Polypropene C–175, which is in liquid form and has the following properties:

Property—            Viscosity grade, C–175
    Viscosity:
        SSU at 100° F. ------------------ 69,000
        Centistokes at 100° F. ---------- 14,500
        SSU at 210° F. ----------------- 790
        Centistokes at 210° F. ---------- 175
        Flash point, ° F. --------------- 450
    Color:
        ASTM --------------------------- <0.5
        Gardner Scale ------------------ <1.0
    Sp. gravity, 60/60° F. -------------- 0.865
    Ave. molecular weight -------------- 1,120
    Refractive index, N 20/D ----------- 1.4766
    Pour point, ° F. -------------------- 30
    Total chlorides, percent ------------ 0.04

The phenol-formaldehyde resin is a resol phenol-formaldehyde marketed as Amberol ST-13X. The properties of this resin are as follows:

Nonheat reactive dimethylol phenol resin
Amber color
Nontoxic
Sp. gr., 1.04
Softening point, 60°–90° C.
Acid number, less than 50

The furnace black employed in the above compositions is marketed as FEF Furnace Black, the dithiocarbamate employed is marketed as Royalac 133, and the thiuram disulfide component of the above compositions is marketed as Methyl Tuads.

Compositions A and B according to the invention are observed to have substantial and very desirable tackiness of the type which is necessary for tire manufacture, whereas composition C, the control, in the absence of the tackifier composition of the invention, has little or no tackiness. Composition B has somewhat greater tackiness than composition A. The tackiness of compositions A and B persists for several days, e.g., up to about 5 days.

In the formulations, A, B and C above, the ethylene-propylene terpolymer rubber employed is replaced by the terpolymer rubber marketed as Enjay EPT 3509, obtaining results similar to those noted above. The latter rubber has the following properties:

|  | Minimum | Maximum |
|---|---|---|
| Mooney viscosity, ML (1+8 min.) at 260° F. | 57 | 67 |
| Ethylene, wt. percent | 50 | 60 |
| Volatiles at 105° C., wt. percent |  | 0.5 |
| Ash, wt. percent |  | 0.3 |
| Stabilizer (butylated hydroxy toluene), wt. percent | 0.20 | 0.35 |
| Vanadium, p.p.m. |  | 100 |
| Calcium, p.p.m. | 500 | 900 |
| Physical properties of a standard composition (20 minute cure at 320° F.): |  |  |
|     Tensile Strength, p.s.i. | 1,225 |  |
|     Ultimate Elongation, percent | 200 |  |
|     Modulus at 100% Elongation, p.s.i. | 650 |  |
| Color | (1) |  |
| Odor | (2) |  |
| Specific Gravity | 0.86 |  |
| Diene, wt. percent | 2–3 |  |

[1] Light amber.    [2] Essentially none.

EXAMPLE 2

The same formulation as composition A above is prepared except that in place of the 10 parts of polyproylene and 10 parts phenol-formaldehyde resin of Composition A, 20 parts of each of the respective materials noted below is employed in a series of compositions indicated as numbers 1 to 9 below.

Compositions 1 to 9 each containing 20 parts respectively of:

1—Polypropene C–175
    2—Coumarone-indene resin (Picco 25)
    3—Phenol-formaldehyde resin (Amberol ST–137)
    4—Coumarone-indene resin (Picco 100)
    5—Butadiene-styrene resin (Buton 100)
    6—Polybutadiene resin (Buton 150)
    7—Terpene resin (Piccolyte S–100)
    8—Hydrocarbon resin (Piccopale 100)
    9—p-Tert butyl phenol-acetylene condensation product (Koresin)

The resins of compositions 2, and 4 to 9 above have the properties set forth below.

Picco 25:
    Softening point (ball and ring), 10° to 20° C.
    Color, Gardner Scale, 3 to 6
    Ash, 0.2% max.
    Sp. gr., 1.090
    Flash point, 160° C.
    Iodine No., 44

Picco 100:
  Softening point (ball and ring), 99° to 107° C.
  Ash, 0.1% max.
  Sp. gr., 1,130
  Iodine No., 43
  Color, Gardner Scale 3 to 5
Buton 100:
  (1,2 polymerization of butadiene and styrene-4 butadiene to 1 styrene)
  Molecular weight, 2,000 to 3,000
  Sp. gravity, 20/4° F., 0.915
  Lbs./gal., 77° F., 7.65
  Nonvolatile matter, 100%
  Viscosity, Gardner Bubble C–E [1]
  Color, Gardner, max. 1 [1]
  Flash point (tag open cup), >200° F.
  Soluble in aliphatic and aromatic hydrocarbons
Buton 150:
  (1,2 polymerization of butadiene)
  Sp. gravity, 0.880
  Viscosity, Gardner Bubble C–L [1]
  Nonvolatile matter, 100%
  Mol. wt., 2,000 to 3,000
  Color, Gardner max., 1 [1]
Piccolyte S–100:
  Composition—polymer of beta-pinene
  Sp. gravity, 1.00
  Softening point (ball and ring), 212° F.
  Ash, less than 0.1%
  Refractive index, 1.530
  Color, Gardner Scale, 8
  Average molecular weight, 650
  Acidity-neutral, acid number, 0
  Chemical resistance: inert to acids, alkalies, or salt solutions.
Piccopale 100:
  For: thermoplastic solid
  Softening point (ball and ring), 100°±3° C.
  Specific gravity at 25/25° C., .970–.975
  Pounds/gal., 8.12
  Color, Gardner Scale, 13
  Flash point C.O.C., 500° F.
  Fire point, 520° F.
  Refractive index at 20° C., 1.5116
  Acid number, less than 1
  Iodine value (Wijs), 120
  Bromine number, 7.3
  Molecular weight, 1,100
Koresin:
  Color, tan to brown
  Form—solid
  Melting point (capillary), 115° C. to 130° C.
  Drop point (Ubbel.), 135° C. to 150° C.
  Soluble in: acetone, benzene, cyclohexane, petroleum ether, ethyl acetate, and sec. butanol.
  Insoluble in: ethanol, $H_2O$, NaOH (aqueous).

In tackiness tests performed according to the procedure described above employing the uncured ethylene-propylene-terpolymer rubber composition A of the invention, and the same compositions but employing in place of the tackifier composition of A including the polypropylene and resin component, the respective materials 1 to 9 above, composition A possesses substantially greater tack as compared to any of the formulations 1 to 9 above, containing either polypropylene alone as in formulation 1 above, or one of the types of resin components employed in the invention tackifier (formulations 2 to 8), or the resin formulation 9, but in the absence of polypropylene.

It is apparent from these tests that the tackifier components of the invention, including the polypropylene in combination with the above-described resin components,

[1] 50 weight percent in Varsol (an aliphatic hydrocarbon solvent similar to mineral spirits).

function in a synergistic manner to produce the above-noted highly improved tackiness of the uncured ethylene-propylene rubber compounds of the invention.

EXAMPLE 3

A series of rubber formulations the same as composition A above, are prepared, differing from composition A above only in that the phenol-formaldehyde component thereof is replaced in each of the respective compositions by 10 parts of coumarone-indene resin (Picco–25), by 10 parts of terpene resin (Piccolyte S–100), by 10 parts of butadiene-styrene resin, by 10 parts of polybutadiene resin, and by 10 parts of a hydrocarbon resin (Piccopale–100).

Tackiness or adhesion tests on all of the above compositions show improved tackiness and adhesion for all of such uncured rubber formulations, with composition A containing phenol-formaldehyde resin exhibiting the greatest degree of tackiness. Those formulations containing coumarone-indene, terpene, and the hydrocarbon resins exhibit a greater degree of tackiness as compared to those formulations containing butadiene-styrene and polybutadiene resins. Of the two latter resins, the former is superior to the latter.

EXAMPLE 4

The following formulations, compositions D to G are prepared:

|  | D | E | F | G |
|---|---|---|---|---|
| Ethylene-propylene copolymer rubber | 100.0 | 100.0 | 100.0 | 100.0 |
| Zinc oxide | 5.0 | 5.0 | 5.0 | 5.0 |
| Furnace black | 40.0 | 40.0 | 40.0 | 40.0 |
| Phenol-formaldehyde resin |  | 10.0 |  |  |
| Coumarone-indene resin |  |  | 10.0 |  |
| Terpene resin |  |  |  | 10.0 |
| Polypropylene | 20.0 | 10.0 | 10.0 | 10.0 |
| Paraquinone dioxime | 1.0 | 1.0 | 1.0 | 1.0 |
| Ditertiary butyl peroxide | 1.5 | 1.5 | 1.5 | 1.5 |
| Sulfur | 0.3 | 0.3 | 0.3 | 0.3 |

In the compositions shown in the table above, the ethylene-propylene copolymer rubber employed is marketed as Enjay EPR 404. This rubber has the following properties:

|  | Minimum | Maximum |
|---|---|---|
| Ethylene, wt. percent | 40 | 46 |
| Mooney Viscosity, ML (1+8 min.) at 212° F. | 35 | 45 |
| Ash, wt. percent |  | 0.3 |
| Vanadium, p.p.m. |  | 50 |
| Volatiles at 105° C., wt. percent |  | 0.5 |
| Calcium, wt. percent |  | 0.09 |
| Stabilizer (butylated hydroxy toluene), wt. percent | 0.05 | 0.20 |
| Physical Properties (30 min. cure of a standard composition at 320° F.): |  |  |
| Tensile Strength, p.s.i. | 1,800 |  |
| Ultimate Elongation, percent | 350 |  |
| Modulus at 300% Elongation, p.s.i. | 1,050 |  |
| Color | (¹) |  |
| Specific gravity | 0.86 |  |
| Unsaturation | 0 |  |

¹ Light gray.

The phenol-formaldehyde resin of Composition E is Amberol ST–137X, the coumarone-indene resin of Composition F is Picco–25, the terpene resin of Composition G is Piccopale 100, and the polypropylene employed is Amopol C–175.

All of the compositions D, E, F and G have tackiness, the tackiness of compositions E, F and G being materially greater, however, than that of composition D containing polypropylene as tackifier. Composition E containing polypropylene and phenol-formaldehyde resin exhibits the greatest degree of tackiness among compositions E, F and G.

EXAMPLE 5

Formulations the same as compositions E, F and G are prepared, but employing in one such series of compositions, 5 parts of polypropylene, and using in another such series 15 parts of polypropylene.

The first series of uncured rubber formulations containing 5 parts of polypropylene have a degree of tackiness somewhat less than the tack of the corresponding compositions E, F and G of Example 4, and the series containing 15 parts of polypropylene have a tackiness somewhat greater than compositions E, F and G, containing 10 parts of polypropylene.

EXAMPLE 6

In the table below is listed a series of various uncured ethylene-propylene rubber compositions further illustrating the invention:

FORMULATIONS

| Components | I | J | K | L | M | N | O | P | Q | R | S |
|---|---|---|---|---|---|---|---|---|---|---|---|
| Ethylene-propylenediene terpolymer rubber | 110 | 100 | 100 | 100 | 100 | | | 100 | 100 | 100 | 100 |
| Ethylene-propylene copolymer rubber | | | | | | 100 | 100 | | | | |
| Zinc oxide | 5 | 5 | 5 | 5 | 5 | 5 | 5 | 5 | 5 | 5 | 5 |
| Fast extruding furnace black | | | | 50 | 50 | 50 | | 50 | | 50 | |
| High abrasion furnace black | 50 | | | | | | 25 | | | | 25 |
| Medium thermal black | | 100 | 100 | | 30 | | 25 | | 25 | | 25 |
| Hard clay | | | 100 | | | | 25 | | | | 25 |
| 2-mercaptobenzothiazole | 0.5 | 0.5 | | | | | | | | | |
| 2-benzothiazyl disulfide | | | | 0.5 | | 0.5 | | 0.5 | 0.5 | | |
| Tetramethyl thiuram disulfide | 1.5 | 1.5 | 1.0 | | 1.0 | | | 1.0 | 1.0 | | |
| Zinc dimethyl dithiocarbamate | | | 2.0 | | 2.0 | | | 2.0 | 2.0 | | |
| p-Quinone dioxime | | | | 0.5 | | 1.0 | 1.0 | | | 1.0 | 1.0 |
| Sulfur | 1.5 | 1.5 | 1.5 | | 1.5 | 0.32 | 0.32 | 1.5 | 1.5 | 0.32 | 0.32 |
| Dicumyl peroxide | | | | 1.0 | | | 2.85 | | | 2.85 | |
| Di tert butyl peroxide | | | | | | 3.0 | | | | | 3 |
| Polypropylene | 6.7 | 5 | 20 | 13.3 | 10 | 5 | 10 | 6.7 | 20 | 5 | 10 |
| Phenol-formaldehyde resin | 13.3 | | | | 20 | | | | | | |
| Straight chain hydrocarbon resin | | 15 | | | | | | | | | |
| Coumarone-indene resin | | | 20 | | | | | | | | |
| Terpene resin | | | | 6.7 | | | | | | | |
| Butadiene-styrene resin | | | | | | 5 | | | | 5 | |
| Polybutadiene resin | | | | | | | 5 | | | | 5 |
| Glycerol ester of hydrogenated rosin (a terpene resin) | | | | | | | | 13.3 | | | |
| Wood rosin (a terpene resin) | | | | | | | | | 10 | | |

From the foregoing, it is seen that the invention provides relatively inexpensive uncured ethylene-propylene rubber formulations containing an improved tackifier composed of two essential ingredients, namely, a polypropylene and certain resins, such tackifier rendering such rubber formulations substantially more tacky than prior art uncured ethylene-propylene rubber formulations, and imparting a tackiness thereto which endures for a number of days, e.g., of at least about 5 days. The improved ethylene-propylene rubber formulations of the invention are particularly valuable in the manufacture of tires.

While we have described particular embodiments of our invention for the purpose of illustration, it should be understood that various modifications and adaptations thereof may be made within the spirit of the invention within the scope of the appended claims.

We claim:

1. An uncured rubber composition containing an ethylene-propylene rubber, and based on 100 parts by weight of said rubber, about 2.5 to about 50 parts of a tackifier, said tackifier consisting essentially of a liquid to solid amorphous polypropylene having a molecular weight in the range of about 300 to about 3,000, and a resin selected from the group consisting of phenol-formaldehyde, coumarone-indene, terpene, and hydrocarbon resins, the weight ratio of said polypropylene to said resin ranging from about 3:1 to about 1:3.

2. The rubber composition as defined in claim 1, said ethylene-propylene rubber being an ethylene-propylene terpolymer rubber.

3. The rubber composition as defined in claim 1, said ethylene-propylene rubber being an ethylene-propylene copolymer rubber.

4. The rubber composition as defined in claim 1, said polypropylene being solid amorphous polypropylene, and said resin being a phenol-formaldehyde resin.

5. The rubber composition as defined in claim 1, and employing 20 parts by weight of said tackifier.

6. The rubber composition as defined in claim 1, wherein said resin is a phenol formaldehyde resin.

7. The rubber composition as defined in claim 1, wherein said resin is a phenol formaldehyde resin.

8. The rubber composition as defined in claim 1, and employing about 5 to about 35 parts of said tackifier per 100 parts by weight of said rubber.

9. An uncured rubber composition containing an ethylene-propylene rubber, and based on 100 parts by weight of said rubber, about 2.5 to about 50 parts of a tackifier, said tackifier consisting essentially of a liquid to solid amorphous polypropylene having a molecular weight in the range of about 300 to about 3,000 and a resin selected from the group consisting of phenol formaldehyde, coumarone-indene, terpene, and hydrocarbon resins, the weight ratio of said polypropylene to said resin ranging from about 3:1 to about 1:3, about 5 to about 200 parts of a carbon black, about 1 to about 250 parts of a pigment, about 0.5 to about 5 parts of a vulcanization accelerator, and about 0.25 to about 5 parts of a cross-linking agent.

10. An uncured rubber composition containing an ethylene-propylene-diene terpolymer rubber and about 2.5 to about 50 parts of a tackifier per 100 parts by weight of said rubber, said tackifier consisting essentially of a liquid to solid amorphous polypropylene having a molecular weight in the range of about 300 to about 3,000, and a resin selected from the group consisting of phenol-formaldehyde, coumarone-indene, terpene, and hydrocarbon resins, the weight ratio of said polypropylene to said resin ranging from about 3:1 to about 1:3.

11. The rubber composition as defined in claim 10, wherein said resin is a phenol-formaldehyde resin.

12. The rubber composition as defined in claim 10, wherein said resin is a coumarone-indene resin.

13. The rubber composition as defined in claim 10, wherein said resin is a terpene resin.

14. The rubber composition as defined in claim 10, wherein said resin is a hydrocarbon resin.

15. The rubber composition as defined in claim 10, employing about equal weight proportions of said polypropylene and said resin.

16. The rubber composition defined in claim 10, wherein said resin is a phenol-formaldehyde resin, said tackifier is employed in an amount of about 5 to about 35 parts per 100 parts of said rubber, and said tackifier consists essentially of about equal parts by weight of said polypropylene and said resin.

17. An uncured rubber composition containing an ethylene-propylene copolymer rubber and about 2.5 to about 50 parts of a tackifier per 100 parts of said rubber, said tackifier consisting essentially of a normally liquid amorphous polypropylene having a molecular weight in the range of about 300 to about 3,000, and a resin selected from the group consisting of phenol-formaldehyde, coumarone-indene, terpene, and hydrocarbon resins, the weight ratio of said polypropylene to said resin ranging from about 3:1 to about 1:3.

References Cited
UNITED STATES PATENTS

| | | | |
|---|---|---|---|
| 3,071,566 | 1/1963 | Caesar | 260—27 |
| 3,220,966 | 11/1965 | Flanagan | 260—27 |
| 2,875,170 | 2/1959 | Ayers | 260—27 |
| 3,241,592 | 3/1966 | Sneary | 152—330 |
| 2,984,281 | 5/1961 | Kraus | 152—330 |

OTHER REFERENCES

Du Pont ECD-330, December 1961, Elastomer Chemical Dept., p. 10 and cover page.

Du Pont Nordel, April 1964, cover page and pp. 25 and 26.

Amberg Rubber and Plastics Age, July 1961, pp. 875–877.

Alliger Vulcanization of Elastomers, 1964, pp. 316 and 317.

JULIUS FROME, *Primary Examiner.*